CAPILLARY WIRE FEED DEVICE

Filed March 4, 1965

Inventor:
C. Fredrick Miller
By Bair, Freeman & Molinare Attys.

United States Patent Office 3,319,859
Patented May 16, 1967

3,319,859

CAPILLARY WIRE FEED DEVICE

Charles Fredrick Miller, Anaheim, Calif., assignor to Basic Products Corporation, Milwaukee, Wis.

Filed Mar. 4, 1965, Ser. No. 437,135
5 Claims. (Cl. 226—91)

This invention relates to an apparatus and method for threading a fine wire through the small tip of a long tube from a remote location upstream. In particular the invention relates to an apparatus and method for threading fine wire through the small bore of a wire bonding capillary tube.

The invention has particular applicability for machines for bonding wires by stitch bonding to semi-conductor devices including ceramic headers wherein small gage wire must be threaded into the capillary of a bonding tool and continuously or intermittently fed to the tool as wire is consumed in the bonding operation.

Semi-conductor wire bonding presents particular problems in that ceramic work pieces are small and the wires to be bonded are so minute that all operations must be done under a microscope. In stitch bonding, wire is paid-out from a source, usually a coil or spool, through the tip of a bonding tool which moves vertically to contact a heated ceramic work piece and by pressure creates a bond between the wire and the work piece. The bonding tool is then raised and moved to a new bonding position, fresh wire being simultaneously fed down through the tool from the wire source. Such process is repeated until the final bond on any one work piece is made at which time the wire is cut or burned by special shears or torches which leave a short tail at about 90° to the main wire or an enlarged globule on the end of the wire preventing the wire from becoming unthreaded as the tool is moved preparatory to operation on the next work piece.

It is essential that the wire be initially easily and accurately fed to the bonding tool and that the drag on the wire during the bonding operations be sufficient at all times to keep the wire taut while still permitting the wire to feed from the source as needed without rupture.

Various feeding devices have been previously employed to convey fine wire. However, none has been able practically to feed the wire through the small bore of bonding capillaries. These bores range in size from about 0.001" in diameter up to about 0.007" in diameter with the most commonly used sizes ranging between 0.001" to 0.0025". Diameter clearance for wire is normally about 0.0005". Further, in usual construction this bore is approached by a relatively long small diameter hole through the capillary mount.

Thus the small wire size renders it impractical to thread wire into capillaries by means of usual feeding devices which act at a remote location upstream since the wire is not sufficiently strong along its longitudinal axis to support the bending moment created by pushing downwards on the wire.

The important feature of this invention is that it enables the feeding of wire through a small capillary. Heretofore it has been possible by various means to feed wire up to the capillary but the wire could not be caused to pass through the capillary either by attempting to continue a flow of gas through the bore or by acting upon the wire as a column from a remote upstream location.

In operation the device and method of this invention has further value in being able to resume normal bonding operations in the event that wire becomes fouled at the bonding end of the capillary tip. Fouling or plugging is a common hazard in stitch bonding and results from inadvertent sideways movement during bonding which scrapes or jams the wire into the end of the bore. Upon this occurrence the hereinafter described feed device may be activated and will act upon the wire with sufficient driving force to push the wire through the capillary and again expose a fresh length so that work may continue. Previously it was necessary to stop bonding and go through the complete operation of replacing and rethreading the capillary.

It is thus an object of this invention to provide an apparatus and method for threading fine wire into minute orifices.

It is a further object of the invention to provide an apparatus and method whereby fine wire may be threaded from a remote upstream location down through an elongated tube and into a capillary orifice.

It is another object of this invention to provide means for quickly and easily re-threading an orifice which inadvertently becomes unthreaded and unplugging an orifice which becomes jammed or plugged.

Other objects will become apparent as the invention is more fully described hereinafter.

The invention will be better understood from the drawings wherein.

Figures 1, 2, 3, 4:
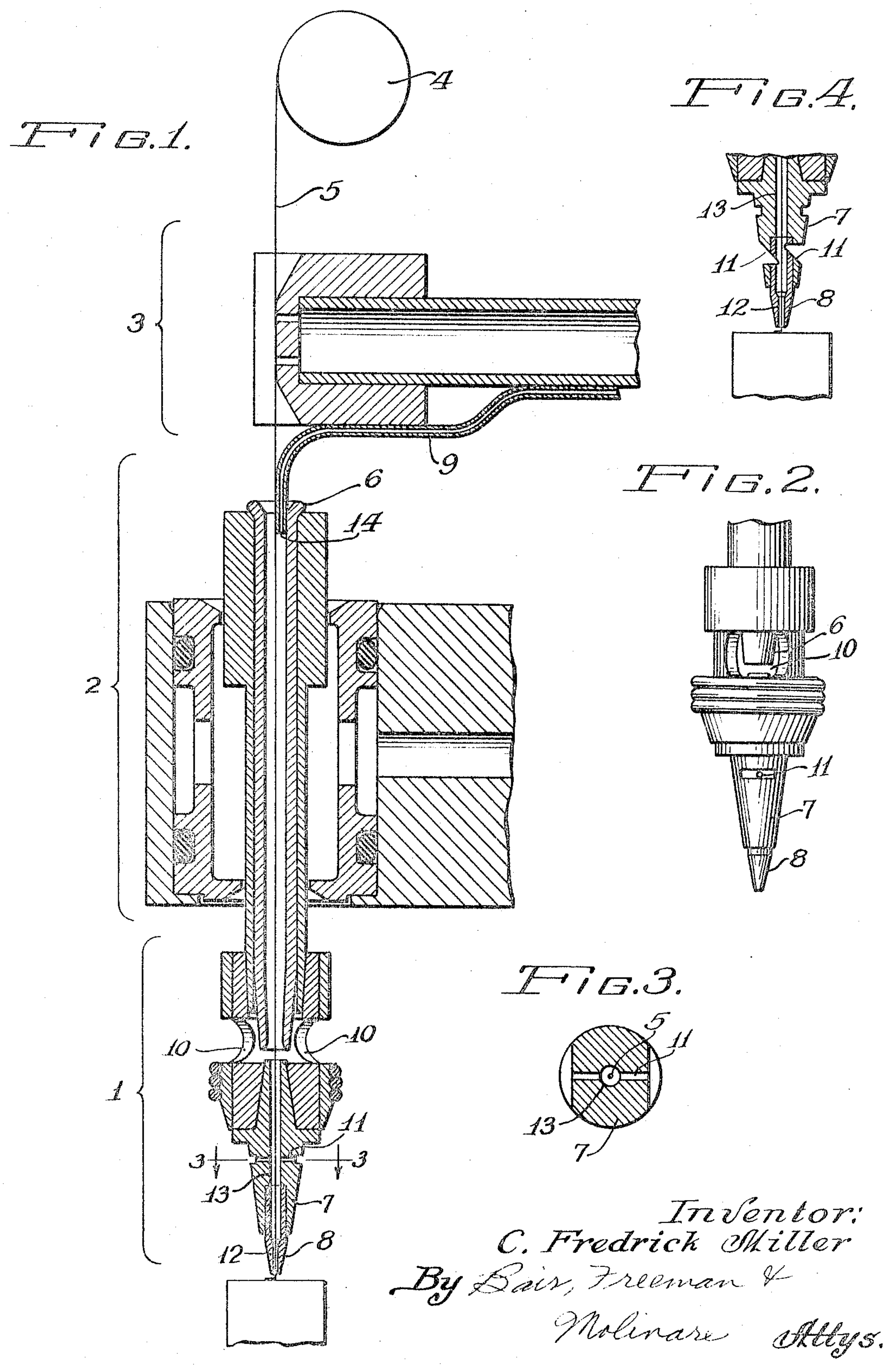
FIG. 1 is a side view, partially in section, of a wire bonding apparatus including the invention.
FIG. 2 is a side view in elevation of a wire bonding head constructed according to the invention.
FIG. 3 is a view along line 3—3 of FIG. 1.
FIG. 4 is an alternative embodiment of the needle portion of a wire bonding head.

FIG. 1 shows in combination a wire bonding head indicated generally at 1, an air spindle for actuating the bonding head shown generally at 2, a wire feed and drag device shown generally at 3 and a wire storage means shown diagrammatically at 4. The operation and construction of the air spindle and actuating means, wire feed and drag device and wire storage means in themselves constitute no part of this invention. An air spindle suitable for use with this invention is described in co-pending application Ser. No. 437,980, filed Mar. 8, 1965. Suitable wire feed and drag means are described in co-pending applications Ser. No. 428,132, filed Jan. 26, 1965, and Ser. No. 433,362, filed Feb. 17, 1965. Suitable wire storage means is described in copending application Ser. No. 437,134, filed Mar. 4, 1965. The essential feature of the present invention is the creation of a flowing gas stream through the air spindle and bonding head and which is of essentially constant linear velocity through the system. This gas stream does not continue through the capillary at the tip of the bonding head since the capillary bore is too small to pass an amount of gas of any consequence. Thus, it is important that an exit port be positioned immediately upstream of the capillary to exhaust all gas from the system before it reaches the capillary. Means for effecting constant gas velocity and exiting gas are hereafter described.

The apparatus of the invention comprises an air spindle 2 with a tube 6 through which wire is passed. Tube 6 is of substantially constant diameter over its length. Below tube 6 and aligned with the bore thereof is the bore 13 of a tubular needle 7 of smaller diameter than tube 6. At the juncture of tubes 6 and 13 are ports 10 (FIG. 2) which are generally oval-shaped and which permit part of the gas flowing in tube 6 to exhaust to atmosphere. The size of ports 10 and the gap at the juncture of tubes 6 and 13 are determined by the volume of gas flow through tube 6 and by the relative size of tubes 6 and 13. Such port sizes and gap are proportioned to exhaust the proper quantity of gas to atmosphere so that the linear velocity of gas in tube 13 is the same as tube 6.

At the terminus of needle 7 is capillary 12 which is of sufficient diameter to accommodate wire 5. Above capillary 12 there are provided ports 11 which as shown in FIGS. 1 and 2 are radial holes passing transversely through needle 7. Alternatively ports 11 may be opposed notches machined into needle 7 as shown in FIG. 4.

The shape of ports 11 may be varied as dictated by convenience and the requirements of the particular wire to be threaded. Generally, it is desirable that the exit ports be diametrically opposed as shown in FIGS. 1 and 4. When a through hole as shown in FIG. 1 is used, it may be made by simply drilling through needle 7. When machine notches as shown in FIG. 4 are used, the notches are inclined so as to leave supporting metal at the tip of needle 7. In any event, it is essential that the total area of the ports 11 be substantially equal to the area of the approach hole 13. Since the diameter clearance between the wire and a capillary 12 is only about .0005 inch, it is apparent that flow of gas through the capillary will be zero or substantially zero and that all or substantially all gas is exited from the system before reaching capillary 12. It is also essential that the openings be positioned relatively near the entrance of capillary 12. The precise location will depend upon the flow velocity of gas and wire size.

For creating the necessary flow of pressurized gas there is provided gas inlet tube 9 which may be made of any flexible material such as plastic or thin metal. Tube 9 is secured externally of air spindle 2 and its lower tip 14 is not connected to tube 6 and thus it does not interfere with the vertical movement of spindle 2.

Preparatory to operating the bonding device shown in FIG. 1 it is necessary to thread wire from spool 4 down through air spindle 2 and bonding head 1, particularly through the capillary at the lower terminus of bonding head 1. Referring to FIG. 1, wire 5 must be threaded from spool 4 vertically downward across the feed and drag device 3 through tube 6, needle 7 and capillary 8. To effect threading, wire 5 is loaded manually a short distance into tube 6 or preferably is loaded by use of the wire feeder and drag device 3. The end of wire 5 is urged downwardly into tube 6 so that its end is below the tip of air tube 9. Gas, preferably inert gas, is then admitted to flow through tube 9 and is directed down along tube 6 and through needle 7.

Gas flows down tube 6 and is partially exited out ports 10 in the needle (FIG. 2). Some of the gas proceeds downwardly through needle 7 and exits out ports 11 which are shown in FIGS. 1 and 2 as radial holes at the mid-portion of needle 7.

The flow of gas thus created entrains wire 5 and conveys it through the system to the entrance of the small bore of capillary 12. Passage of wire 5 through capillary 12 is effected by continued movement of the gas stream in a turbulent manner. The random motion of the wire thus produced first causes the end of the wire to seek the entrance to the capillary bore 12 and subsequently transmits a driving force which continuously conveys wire through the bore.

In a stitch bonding operation, wire is paid out through capillary 12 during movement from point of attachment on a work piece to the next. Operation of the feed device herein described is caused to take place only when required. Operation is controlled by a foot switch which actuates a solenoid valve to admit gas through pre-set pressure and flow controls to tube 9. Inert gas is preferred since it is employed in the vicinity of work pieces and operations where oxidation is to be avoided.

While but one embodiment of the invention has been shown and described herein, it will be understood that it is illustrative only and is not to be taken as definitive of the scope of the invention, reference being had for such purpose to the appended claims.

I claim:

1. Device for threading wire through a capillary comprising means defining an elongated passage having at least three sections of diminishing cross-section and terminating in a capillary passage through which wire is to be threaded, a source of pressurized gas communicating with said passage for creating a turbulent stream of gas therethrough from the larger end thereof toward the capillary passage, means for exhausting gas from said passage adjacent to the junctures of different sections thereof to maintain constant linear velocity of said gas through said passage as said gas passes from one section of said passage to the next, and means adjacent said capillary passage for exhausting substantially all gas from said passage substantially to obviate passage of gas through said capillary.

2. Device of claim 1 wherein said passage comprises a first tube, first ports communicating with one terminus of said tube for exhausting a portion of gas flowing therethrough, a second tube of smaller diameter than said first tube and communicating with said ports and said first tube, and second ports communicating with said second tube near one terminus for exhausting substantially all gas flowing therethrough.

3. Device of claim 2 wherein the total cross-sectional area of said second ports is substantially equal to the cross-sectional area of said second tube.

4. Device of claim 3 wherein said second ports are opposed radial holes communicating with said second tube.

5. Device of claim 3 wherein said second ports are opposed notches communicating with said second tube.

References Cited by the Examiner

UNITED STATES PATENTS 3,116,889 1/1964 Lasch ------------ 226—91 X

M. HENSON WOOD, Jr., *Primary Examiner.*

R. A. SCHACHER, *Assistant Examiner.*